A. A. HENDRICKSON.
EXERCISER.
APPLICATION FILED FEB. 20, 1919.
1,307,905.
Patented June 24, 1919.
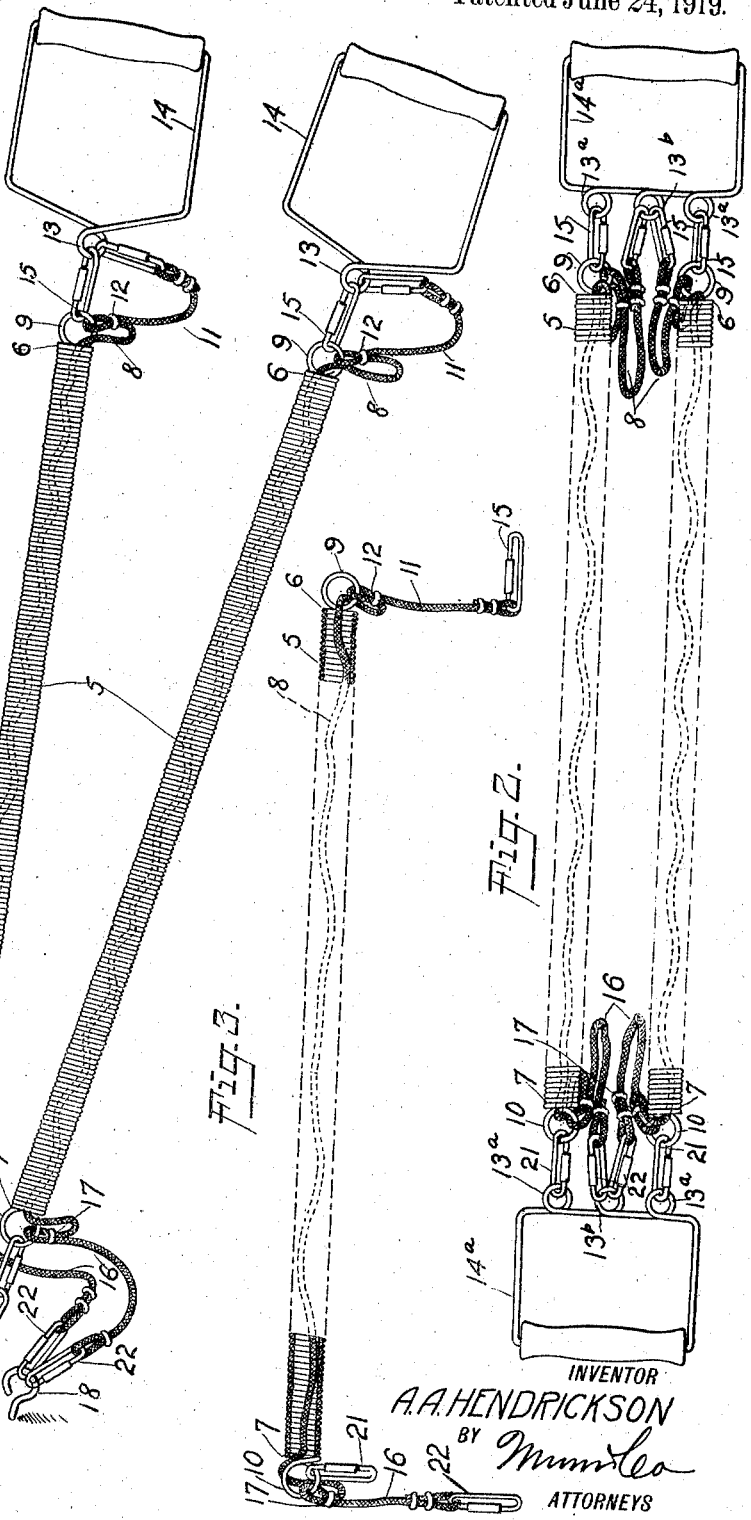

UNITED STATES PATENT OFFICE.

ABRAM A. HENDRICKSON, OF WESTWOOD, NEW JERSEY.

EXERCISER.

1,307,905. Specification of Letters Patent. Patented June 24, 1919.

Application filed February 20, 1919. Serial No. 278,182.

*To all whom it may concern:*

Be it known that I, ABRAM A. HENDRICKSON, a citizen of the United States, and a resident of Westwood, in the county of Bergen and State of New Jersey, have invented a new and Improved Exerciser, of which the following is a full, clear, and exact description.

My invention has for its object to provide an exerciser having coil springs through which extend safety or reinforcing cords, the terminals of the cords extending out of the terminals of the springs and being secured relatively to the springs, the cords at one set of the spring terminals extending beyond the points where they are secured and being connected with a wall fastener, which is supplementary to the wall fastener to which the springs are secured.

Additional objects of the invention will appear in the following specification in which the preferred form is described.

In the drawings, similar reference characters refer to similar parts in all of the views, in which—

Figure 1 is a perspective view illustrating my invention;

Fig. 2 is a fragmentary view showing the invention as applied to a chest expander; and Fig. 3 is a fragmentary view showing one of the springs provided with my improvement.

By referring to the drawings, it will be seen that two coil springs 5 are provided, each coil spring being open at its ends 6 and 7, as best illustrated in Fig. 3 of the drawings, there being provided safety or reinforcing cords 8, one of which extends through each of the springs 5, and out through the open terminals 6 and 7 of the springs. At the ends of the springs there are rings 9 and 10, which are preferably integral with the springs and which serve as a means for securing the ends of the springs to handles or wall fasteners. The cords 8 are secured to the rings 9 and 10, as shown in the drawings, which serve as a means to limit the stretch of the springs and prevent breakage. The cords also serve to confine the springs should they break at any point, since the cords will retain the broken portions of the springs and prevent them from injuring the operator or other persons.

The cords 8 have terminals 11, which extend beyond the point 12, where they are secured to the rings 9, these terminals 11 being normally connected with the rings 13 on the handle members 14. The rings 9 are connected within the rings 13 by links 15, which may be opened when desired, and in a manner readily understood, to permit of the removal of the handles from the springs. The terminals 16 of the cords 8 extend beyond the points 17, where they are secured to the rings 10, and to an auxiliary hook 18, the springs 5 being supported by a hook 19 and a yoke 20, which is connected with the rings 10, by links 21, it being possible to open these links 21 in a manner readily understood to remove the springs 5 from the yoke 20. It will be seen that while the springs 5 are supported by the hook 19, the yoke 20, and the links 21, and the handles 14 connected with the springs 5 by means of the links 15, there is, nevertheless, an independent support for the springs 5, which is secured to the hook 18 and to the handles 14, which will support the springs and prevent them from striking the operator or other persons should said springs break. However, as the cords 8 are secured to the rings 9 and 10 at the ends of the springs 5, the outward movement of the rings 9 relatively to the rings 10, is limited, and the possibility of the springs breaking is greatly lessened.

When it is desired to use the springs 5 as a chest expander, the rings 9 at one end of the two springs 5 are connected with rings 13ª on a handle 14ª, by means of links 15, and the terminals 11 of the cords 8 are connected with another ring 13ᵇ on the handle 14ª, by any suitable means, such as the links 15. The rings 10 at the other ends of the springs 5, are freed from the yoke 20, by opening the links 21, and the rings 10 are then connected with rings 13ª on another handle 14ª, and the terminals 16 of the cords 8 are freed from the hook 18, by opening the links 22, the links 22 then being connected with the ring 13ᵇ on the last-mentioned handle 14ª. It will be seen that the cords 8 will not only serve to limit the movement of the springs 5 and thereafter assist in preventing breakage, but they will also serve to prevent the parts of the springs from doing injury should the springs be broken while the exerciser is in use.

Having thus described my invention, what I claim is:

1. In an exerciser, a coil spring having open ends, a cord extending through the spring and out through its open ends, and means to secure the cord relatively to the terminals of the spring, the terminals of the cord extending out at the ends of the spring beyond the said means.

2. In an exerciser, a coil spring having open ends with rings at its ends, and a cord extending through the spring and out through its open ends, the cord being secured to the rings and having terminals extending beyond said rings.

3. In an exerciser, a coil spring having open ends, a cord extending through the spring and out through its open ends, means to secure the cord relatively to the terminals of the spring, a terminal of the cord extending at one end of the spring beyond said means; and means to secure the cord terminal to a support independent of a support for the spring.

4. In an exerciser, a coil spring having open ends, a cord extending through the spring and out through its open ends, means to secure the cord relatively to one terminal of the spring, a terminal of the cord extending beyond the other terminal, and means for securing the cord terminal to a support independent of a support for the spring.

5. In an exerciser, a coil spring having open ends, and a cord extending through the spring and out through its open ends, the coil spring having at its ends means to which a handle and a support may be secured, the cord being secured to the said means and extended at one end of the spring for connection with a supplemental support.

6. In an exerciser, a coil spring having open ends, a cord extending through the spring and out through its open ends, the coil spring having at its ends means to which a handle and a support may be secured, the cord being secured to said means and extending at one end of the spring for connection with a supplementary support, a handle secured to said means at the other end of the spring; and a cord at the last-mentioned end of the spring extending beyond the point where it is secured to the means and being secured to the handle.

7. In an exerciser, a wall support, two coil springs having open ends with rings at their ends, means connecting the rings at one set of spring ends with the wall support, two handles, means connecting the rings at the other set of spring ends with the handles, cords extending through the coil springs and out through their open ends, the cords being secured to the rings and with their terminals extended beyond the rings at the first-mentioned ends of the springs, and an auxiliary wall support to which the cord terminals are secured.

8. In an exerciser, a wall support, two coil springs having open ends with rings at their extremities; means connecting the rings at one set of spring ends with the wall support, two handles, means connecting the rings at the other set of spring ends with the handles, cords extending through the coil springs and out through their open ends, the cords being secured to the rings and with their terminals extended beyond the rings at the first-mentioned ends of the springs, and an auxiliary wall support to which the cord terminals are secured, the other terminals of the cords extending beyond the springs and being secured to the handles.

ABRAM A. HENDRICKSON.

Copies of this patent may be obtained for five cents each, by addressing the "Commissioner of Patents, Washington, D. C."